Aug. 17, 1954 W. S. FLETCHER 2,686,609
AUXILIARY TIP FUEL TANK
Filed Dec. 6, 1948 2 Sheets-Sheet 2
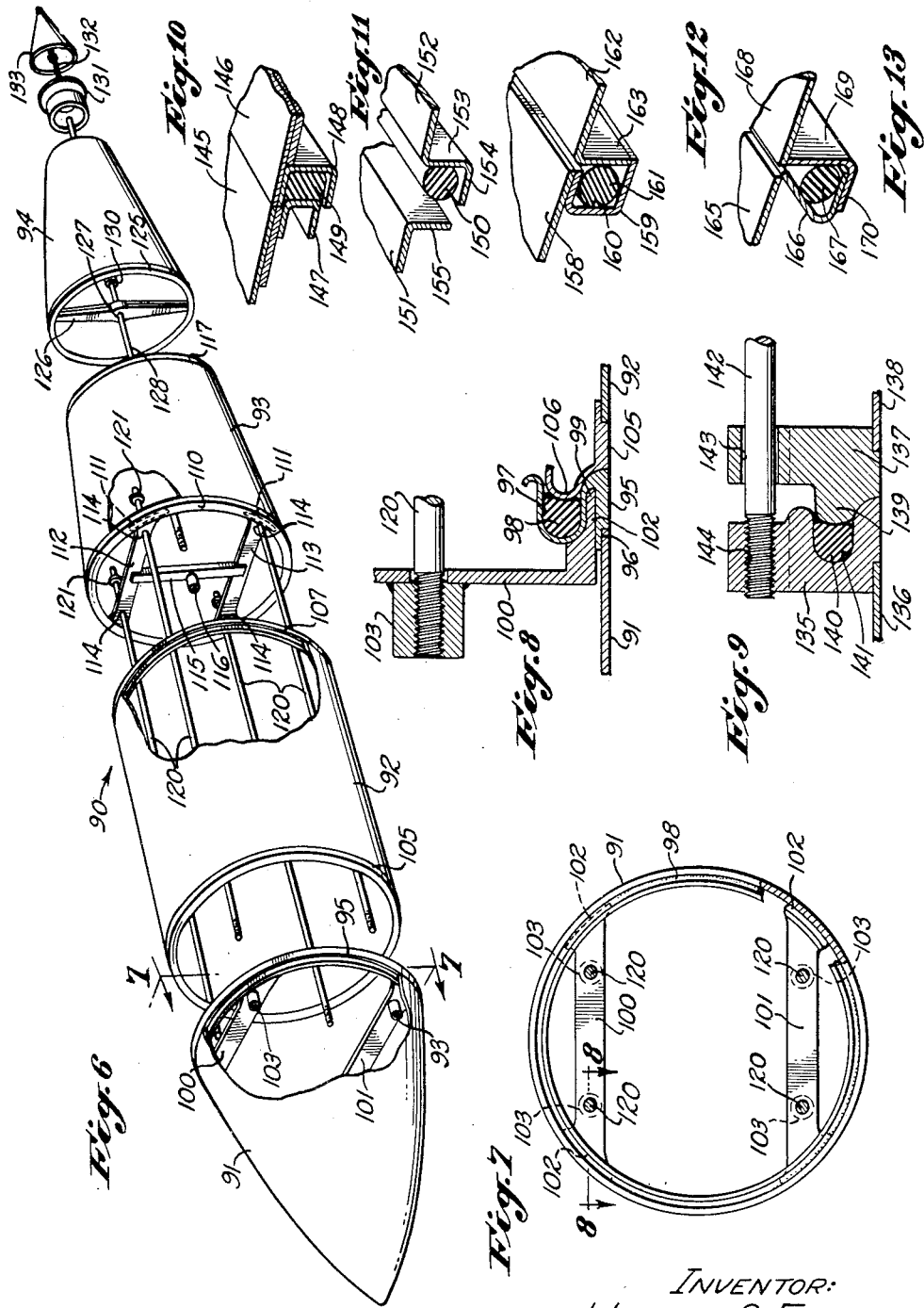
INVENTOR:
WENDELL S. FLETCHER
BY HIS ATTORNEYS
HARRIS, KIECH, FOSTER & HARRIS Patented Aug. 17, 1954

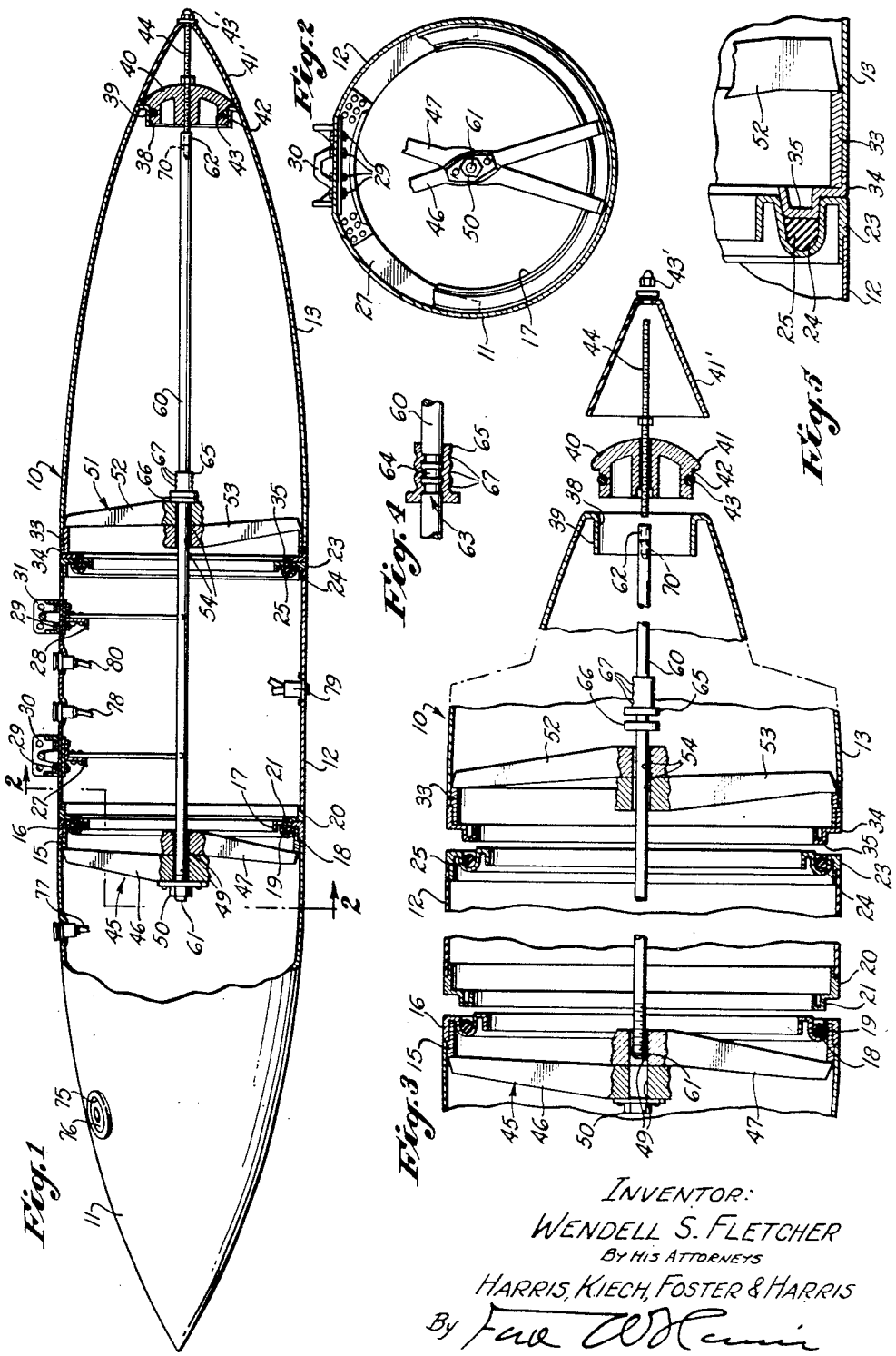

2,686,609

UNITED STATES PATENT OFFICE 2,686,609

AUXILIARY TIP FUEL TANK

Wendell S. Fletcher, South Pasadena, Calif., assignor to Fletcher Aviation Corporation, Pasadena, Calif., a corporation of California Application December 6, 1948, Serial No. 63,822

18 Claims. (Cl. 220—5)

This invention relates generally to receptacles of the closed type, and more particularly to an auxiliary fuel tank for use on aircraft. Specifically, the invention pertains to a fuel tank adapted for attachment to the exterior of an airplane, such as, for example, the wing tip.

Conventional fuel tanks mounted on the wing tips of airplanes are made of streamline shape in order to reduce the aerodynamic drag or resistance to the forward motion of the craft. It is the usual practice to construct such fuel tanks in two parts, that is, with upper and lower shells, each having a perimetrical bead which is welded to the bead of the other shell. Such a projecting "bead-weld" impairs the streamline effect and thus produces a parasitic drag tending to reduce the speed of the airplane. Since such wing-tip fuel tanks are used primarily in military aircraft of the fighter types, which are designed to attain extremely high speeds, it is imperative that the parasitic drag be reduced to a minimum. It is therefore an important object of this invention to provide an auxiliary fuel tank which is so constructed that it has a smooth, continuous, streamlined outer surface or "skin," free from projections which might otherwise cause drag tending to reduce the speed attainable by the airplane to which the tank is attached.

Another object of the invention is to provide an auxiliary fuel tank which is composed of a plurality of sections capable of being assembled in axial end-to-end relationship, one of the components being in the form of a conoidal shell and constituting the nose section, and another of said components being constructed as a similar but more conical tail section or shell.

Another object is to provide clamping means of the tension type, disposed entirely within the tank, for clamping the several sections in assembled relationship. The latter object is best attained by providing strut members within the nose and tail sections or shells, and clamping means insertable through an axial opening in the tail section and engageable with said strut members for drawing the same toward each other so as to clamp the several sections in end-to-end abutting relationship. A related object is to provide clamping means which comprises a spindle adapted to pass through an axial hole in one strut member and having a screw-threaded end capable of being screwed into a threaded hole in the other strut member, the spindle also having a rotatable collar thereon which is adapted to be moved axially into engagement with said other strut member in response to rotation of the spindle so as to draw the nose and tail sections toward each other and thus clamp the several sections of the tank in assembled relation.

Another object is to provide a clamping spindle which has its rearward end disposed adjacent the rear end of the tail section so as to be readily accessible, said end of the spindle being of polygonal shape to adapt it to be readily rotated by a wrench or other tool.

Another object is to provide closure means for sealing the opening in the tail section through which the clamping spindle is inserted, said closure means consisting of a cap fitting within the opening and having an annular flange engageable with the end of the section, a bolt on the cap being screwed into a threaded hole in the rear end of the spindle to retain the cap in place.

Another object is to provide a tank, of the character referred to, which embodies means for positively sealing the joints between the several sections so as to produce a tank which is fluid tight.

Another object is to provide, in a tank of the type indicated, strut members which consist of a pair of crossing strut elements, each engageable with a ring secured to the inner surface of the nose or tail section so as to afford maximum bearing engagement without reducing the fuel capacity of the tank.

A further object is to provide centering means for locating and retaining the several sections in exact axial alignment.

A still further object is to provide a tank, of the type referred to, having means by which it can be readily attached to or removed from the exterior of an aircraft.

It is customary, particularly during military conflict, to transport the auxiliary fuel tanks to the combat zones in knocked-down condition so as to conserve shipping space, the components of the tanks being assembled by mechanics at the air fields. Due to the complexity of the assembly operations, considerable time is consumed, it being necessary to expend approximately twenty-eight man hours to assemble a single auxiliary tank. In an effort to reduce the time involved in assembling such fuel tanks in combat theaters, the military Air Force has recently expressed the desire to obtain a fuel tank which can be assembled on the field within the prescribed limit of two man hours. It is therefore an important object of this invention to provide an auxiliary fuel tank, the parts of which can be assembled easily and quickly so as to expedite the forming of the tank and its installation on an airplane.

In accordance with the present invention, the improved auxiliary fuel tank is so constructed that its components can be completely assembled in fifteen man minutes, thus effecting a tremendous saving in time which is extremely important to the military, especially during war.

Further objects will be apparent from the following specification and from the drawings, which are for the purpose of illustration only, and in which:

Fig. 1 is a side elevational view of a wing-tip fuel tank constructed in accordance with the present invention, the wall of the tank being broken away to better illustrate the internal parts;

Fig. 2 is a cross-sectional view, taken on line 2—2 of Fig. 1;

Fig. 3 is an enlarged, fragmentary, sectional view of the sections of the tank, showing them in disassembled relationship;

Fig. 4 is an enlarged detail of the intermediate screw-threaded portion of the clamping spindle and the collar mounted thereon;

Fig. 5 is an enlarged detail of the combined centering and sealing means;

Fig. 6 is a perspective view of an auxiliary fuel tank of alternative construction, the parts of the tank being shown in disassembled relationship and partly broken away to disclose the interior thereof;

Fig. 7 is a cross-sectional view, taken on line 7—7 of Fig. 6;

Fig. 8 is a transverse sectional view, taken on line 8—8 of Fig. 7, showing the construction of the adjoining circular edges of the nose and succeeding tank sections which are clamped together;

Fig. 9 is a sectional view similar to Fig. 8 but illustrating an alternative sealing means; and Figs. 10, 11, 12, and 13 are perspective sectional views showing modified versions of the sealing means used between the edges of adjacent sections of the tank.

Referring to Figs. 1 through 5 of the drawings in detail, the improved wing-tip fuel tank 10 comprises a nose section 11, an intermediate tubular section or body 12, and a tail section 13, these components being assembled by means, to be hereinafter described, to produce a tank of streamline contour.

The nose section 11 consists of a sheet metal shell of conoidal shape which has an open base end. Placed within the open base end of the shell 11 is a ring 15 which extends axially from the shell as shown best in Fig. 3. Surrounding the projecting end of the ring 15 and suitably secured thereto is the outer portion 16 of an annular flange member 17. The member 17 is substantially channel shape in cross section and provided with walls defining an annular recess or seat 18 in which is disposed a resilient, compressible sealing ring 19, commonly referred to as an O ring.

The intermediate section 12 is also constructed from sheet metal and is in the form of a frustum having its larger end of the same diameter as that of the open end of the nose section 11, to adapt it to match therewith. An annular flange member 20 is suitably secured to the larger end of the intermediate section 12 and has an annular extension or ridge 21 which is adapted to be received in the seat 18 of the flange member 17 so as to locate and retain the two sections 11 and 12 in axial alignment, the sections being clamped together in this relationship, by means to be later described, so that the sealing ring 19 is compressed by this action. At its rearward smaller end, the intermediate section 12 has an annular flange member 23 which is provided with walls defining an annular recess or seat 24 in which is disposed a resilient compressible sealing ring 25, this flange member being similar to the flange member 17, previously described.

A pair of arcuate reinforcing members 27 and 28, preferably made from Z sections, (Fig. 1) are provided with pads disposed against the inner surface of the upper portion of the intermediate section 12 and secured thereagainst by means of bolts 29. The arcuate reinforcing members 27 and 28 are in the form of ribs and extend throughout substantially one half of the circumference of the section 12 as shown in Fig. 2. Secured against the outer surface of the section 12 by the bolts 29 are support members or hangers 30 and 31 which are employed as the means for attaching the fuel tank to the wing of an airplane.

The tail section 13 is constructed from sheet metal in the form of a conoidal shell, the diameter of the base portion being equal to that of the smaller end of the intermediate section 12 to adapt it to match therewith. Secured within the larger end of the tail section 13 is a ring 33 which projects beyond the end of the section to receive an annular flange member 34. The flange member 34 has an annular ridge or tongue 35 adapted to enter the annular seat or recess 24 of the flange member 23, when the intermediate and tail sections 12 and 13 are assembled, so as to retain these sections in axial alignment and compress the sealing ring 25.

At its rear apex end, the tail section 13 is provided with an access opening 38 which is defined by an inwardly directed annular flange wall 39. The access opening 38 is normally closed by means of a circular closure member or cap 40 having an annular flange 41 abutting against the rear end of the section 13 and a reduced portion 42 disposed in the opening. An annular groove in the portion 42 receives a resilient sealing ring 43 which engages the wall 39 of the opening 38 to provide a fluid-tight joint. The cap 40 has an axial hole for receiving a bolt 44 which is employed in the manner to be later explained to retain the cap in the opening and against the rearward end of the tail section 13. The rearward end face of the cap 40 is preferably enclosed by a conical tip member 41' which is slid over the bolt 44 with its base seated against the end of the tail section, a nut 43' being screwed onto the bolt to retain the member in place.

The several sections 11, 12, and 13 of the tank 10 are drawn together in axial engagement and retained in this relationship by clamping means to be next described. Disposed within the nose section 11 is strut means 45 which preferably consists of a pair of crossing struts or clamping elements 46 and 47. The ends of the strut elements 46 and 47 are somewhat pointed (Fig. 2) and are recessed to adapt them to engage against the inner end of the ring 15 of the nose section 11. The strut elements 46 and 47 have aligned axial holes 49 and the element 46 has a nut 50 secured against its forward face in alignment with the holes 49. If desired, only a single strut element may be employed, although I prefer to use two as described. Also, the form of the strut means may be varied as desired.

Disposed within the tail section 13 is similar strut means 51 which consists of a pair of crossing strut or clamping elements 52 and 53 of the same general character as the elements 46 and 47 described above, the elements 52 and 53 having aligned axial holes 54 therein.

A relatively long clamping spindle 60 is adapted to be inserted through the opening 38 and to pass through the aligned holes 54 and 49 of the respective strut members 51 and 45. The spindle 60 has an inner screw-threaded end 61 adapted to be screwed into the nut 50 carried by the strut element 46. At its outer extremity, the spindle 60 is made polygonal in shape so as to provide, in effect, a bolt head 62 which may be readily engaged by a socket wrench (not shown), inserted through the opening 38 to rotate the spindle. At a point intermediate its ends and located adjacent the rearward machined face of the strut element 52 the spindle is provided with a peripherally grooved portion 63 (Fig. 4). Disposed on the spindle 60 is a sleeve-like abutment collar 65, one end of which is adapted to engage the rearward face of the strut element 52. The collar 65 is slid onto the spindle 60 to overlie the grooves 64, and thereafter its tubular wall is indented from the outside to provide inwardly directed lugs 67 engageable in the grooves to retain the collar in place.

To assemble the three sections 11, 12, and 13 to provide the fuel tank 10, the strut member 45 is first located within the nose section 11, against the ring 15 thereof. The larger end of the intermediate tubular section 12 is then placed against the open rearward end of the nose section 11 with its tongue 21 disposed in the seat 18. In a like manner the strut member 51 is installed in the tail section 13 and the open end of the tail section is placed against the smaller rearward end of the intermediate section 12, with the tongue 35 entering the annular seat 24. After the three sections have thus been disposed in axial abutting relationship, the clamping spindle 60, with the collar 65 mounted thereon, is inserted through the access opening 38 and passed through the aligned holes 54 and 49 of the strut members 51 and 45. The inner threaded end 61 of the spindle 60 is then screwed into the threaded hole of the nut 50 secured to the strut element 46 so that by rotating the spindle, by means of a socket wrench, the spindle is screwed through the nut. During such rotation of the spindle 60, the end of the collar 65 firmly engages the rearward face of the strut element 52. The result of this action is to draw the two strut members 51 and 45 toward each other so as to cause the tank sections 11, 12, and 13 to be firmly clamped together. In order to reduce friction to a minimum, an anti-friction thrust bearing 66 may be interposed between the strut member 51 and the collar 65, if desired.

It is thus seen that the single clamping spindle 60 serves to draw the sections together with sufficient force to compress the sealing rings 19 and 25 so as to provide leak-proof joints between the sections. It will also be apparent that, due to the engagement of the tongues 21 and 35 in the respective annular seats 18 and 24, the sections are automatically positioned and retained in axial alignment.

After the sections of the tank have been assembled in the manner explained above, the rear or aft end of the tank is closed by means of the cap 40 which is inserted into the opening 38 with its flange 41 abutting the end of the section 13. The bolt 44 is then inserted through the cap and its inner threaded end screwed into a tapped hole 70 in the rearward end of the spindle 60, the end of the spindle entering a counterbore of the cap to aid in centering these parts. Due to the sealing ring 43, the tank 10 is sealed at the opening 38 to prevent leakage of liquid fuel therethrough. The tip member 41' is then attached to the end of the section 13, and the resulting fuel tank 10 is of streamline contour. Since its outer surface is free from protuberances, the tank will create a minimum amount of drag, and this will not reduce the forward speed of the airplane, to which the tank is applied, to any appreciable extent.

The present fuel tank 10 may be provided with accessories common to receptacles of this character, such devices not being herein disclosed in detail, since they form no part of the invention. Suffice it to state that the tank has a filler opening 75 in the nose section 11 through which the liquid fuel can be poured into the tank, the opening being normally closed by a filler cap 76. The tank 10 is also provided with the usual delivery tubes 77 and 78 whose ends are disposed within a strainer device 79, and a vent tube 80.

Referring now to Figs. 6 to 12 of the drawings, the present invention further contemplates a slightly modified construction of the auxiliary fuel tank and several alternative constructions of the tank sealing means. The auxiliary fuel tank 90 shown in Fig. 6 includes a nose section 91, a pair of intermediate sections 92 and 93, and a tail section 94. The nose section 91 is conoidal in shape and to the rim of its rearward open end is suitably secured a clamping annulus 95 which has a peripheral recess 96 for receiving the edge of the nose section and an annular inner recessed portion 97 in which an O type sealing ring 98 is disposed (Fig. 8). Between the two recesses 96 and 97, the annulus 95 is formed with an intermediate annular recess 99. Secured within the open end of the nose section 91 is a pair of cross strut members 100 and 101 which are in the form of bars having curved shoe portions 102 at their ends. The strut members 100 and 101 are adapted to extend across the interior of the nose section 91, as shown in Figs. 6 and 7, with their curved shoe portions 102 fitting snugly in the annular recess 99 of the clamping annulus 95. Each strut member 100 and 101 is provided with a boss at each of its ends, each boss having a tapped hole 103 which is used for the purpose to be hereinafter explained.

The first tubular intermediate section 92 is substantially cylindrical in shape, and at its forward end it carries a ring 105 which, as shown in Fig. 8, has an inner portion or tongue 106 of arcuate cross section, this portion being adapted to enter the inner recess 97 of the annulus 95, when the two components 91 and 92 are drawn axially together, so as to compress the sealing ring 98 which is preferably made from synthetic rubber. By this means a leak-proof connection is established between the components 91 and 92. At its other end, the intermediate section 92 carries an annulus 107 which is of the same construction as the annulus 95 previously described and which has an inner recess or seat in which an O type sealing ring is disposed, these entities being the same as those shown in connection with the annulus 95 and therefore not disclosed in detail.

The second intermediate section 93 is of frustoconical shape, and at its larger forward end it carries a ring 110 which is similar to the ring 105 described before. Disposed in the rearward side of the ring 110 are the curved shoe portions 111 of strut members 112 and 113 which have apertures 114 therein which are adapted to align with the tapped holes of the strut members 100 and 101 when the tank is assembled. Extending at right angles between the strut members 112 and 113 with its ends secured thereto is a bar 115 having a central boss provided with a threaded aperture 116. At its rearward end, the intermediate section 93 has an annulus 117 of the same construction as the annuli 95 and 107 described above.

The three sections 91, 92, and 93 are assembled by bringing their adjoining ends together, the tongue at the forward end of each section entering the respective recess or seat provided in the rearward end of each section disposed forwardly thereof. After the sections 91, 92, and 93 have been arranged in the order named above, tierods 120 are inserted through the rearward open end of the section 93 and passed through the apertures 114 of the strut members 112 and 113, and the forward threaded ends of the tie-rods are screwed into the tapped holes 103. With the tie-rods 120 thus inserted, nuts 121 are screwed onto their rearward threaded ends and set up against the rearward side of the strut members, the result of this action being to draw the sections 91, 92, and 93 firmly together and to compress the sealing rings to provide leak-proof connections. The tie-rods 120 are substantially equally spaced and provide a rigid connection which effectively resists stresses and strains to which the auxiliary tank might be subjected. It is apparent that any suitable number of intermediate sections such as those shown at 92 and 93 may be emeployed to produce an auxiliary fuel tank of the required capacity.

The tail section 94, which is attached to the rearward end of the section 93, is of conoidal shape and carries a ring 125 which is similar to the ring 105, previously described, and which is adapted to compress a sealing ring (not shown) in the annular seat of the annulus 117 when the components 93 and 94 are drawn together in the manner to be later explained. Extending across the open forward end of the tail section 94 with its ends suitably secured to the ring 125 is a cross strut member or bar 126 having a central aperture 127 through which a clamping rod 128 is adapted to pass after being inserted through an access opening in the rearward end of the tail section 94. The clamping rod 128 is similar to the clamping rod 60 disclosed in Fig. 3, and therefore it is not described in detail. Suffice it to state that the rod 128 has an inner screw-threaded end adapted to be screwed into the tapped hole 116 and carries a collar 130 which is identical with, and which is applied to use in the same manner as, the collar 65 to draw the tank sections 93 and 94 firmly together. A cap 131, similar to the cap 40, is employed to close the access opening of the tail section 94, and a bolt 132 screwed into a tapped hole in the outer end of the rod 128 secures the cap in closed position, the cap being enclosed by a conical tip member 133.

It will be apparent that the auxiliary fuel tank 90 is similar to the tank shown in Figs. 1 to 5 but is provided with additional intermediate sections so that the capacity of the tank can be readily varied to meet the requirements by adding or subtracting sections, it being noted that the only change required is in the tie-rods 120 which may be furnished in appropriate lengths to suit the conditions. Due to the increased length of the auxiliary fuel tank 90, it has been found desirable to employ means in addition to the single central clamping spindle, shown in Fig. 3, and in the modified structure this additional means consists of the tie-rods 120 which can be easily and quickly inserted through the open rearward end of the rearmost intermediate section, such as, for example, the section 93, prior to the attachment of the tail section 94. As in the structure disclosed in Fig. 3, the auixiliary fuel tank 90 can be completely assembled on the field in a few man minutes, and thus constitutes an important improvement over conventional fuel tanks which require many man hours to assemble them.

Referring now to Fig. 9, the invention contemplates sealing means between the sections of the tank which are exceptionally strong and rigid, this alternative structure including an annulus 135 carried by one section 136 and a ring 137 carried by the adjacent end of another section 138. The ring 137 has an annular bead or tongue 139 which is adapted to enter and compress a sealing ring 140 disposed in a seat 141 of the annulus 135, the sections 136 and 138 being drawn together by tie-rods 142 which pass through apertures 143 in the ring with their threaded ends screwed into tapped holes 144 in the annulus 135.

In the alternative construction shown in Fig. 10, the tank sections 145 and 146 are provided with respective sheet metal rings 147 and 148 which are of channel shape cross section, the ring 147 being adapted to enter the ring 148 to compress a sealing ring 149 therebetween.

In the modified construction shown in Fig. 11, the means for compressing the sealing ring 150 is provided on the tank sections 151 and 152 themselves, the section 152 having an annular flange 153 formed with a ledge 154 upon which the ring 150 is seated. The tank section 151 has an inturned flange 155 which engages the sealing ring 150 to compress the latter as the tank sections are drawn together.

Fig. 12 illustrates a further modified structure in which one tank section 158 has a channel shaped annulus 159 providing an annular seat 160 for receiving a sealing ring 161. The other tank section 162 has an inturned flange 163 adapted to engage the sealing ring 161 to compress the same.

A still further modified tank sealing means is shown in Fig. 13. In this construction one tank section 165 is provided with a ring 166 of V-shape cross section, a compressible sealing ring 167 of circular cross section being carried by the ring 166. The other tank section 168 has an inner annulus 169 of angular cross section, the annulus having a lower lateral leg 170 which underlies the lower portion of the ring 166. When the two sections 165 and 168 are drawn together, the sealing ring 167 is compressed between the ring 166 and the annulus 169 to provide a liquid-tight seal.

It will be understood that clamping means other than the spindle 60 or 128 and the tie-rods 120 may be employed, it being within the concept of this invention to provide various forms of clamping means of the tension type, such as turnbuckles engageable with tie-rods or other means detachably connected between certain of the tank sections, for the same purpose.

While the improved fuel tank has been herein disclosed as embodied in several preferred forms of construction, by way of example, it will be apparent that other changes and modifications might be made therein without departing from the spirit of the invention. Consequently, I do not wish to be limited in this respect, but desire to be afforded the full scope of the appended claims.

I claim as my invention:

1. A streamlined fuel tank, comprising: at least one tubular member; a first generally conical shell member having an open end disposed against and abutting one end of said tubular member and having a closed end; a second generally frusto-conical shell member having an open end disposed against and abutting the other end of said tubular member and provided with a port at its other end; first and second strut means disposed entirely within and in engagement with said first and second shell members, respectively, and adjacent the open ends thereof; clamping means entirely within said tubular and shell members and extending through said tubular member and engaging said strut means and drawing said strut means toward each other so as to clamp said shell members and said tubular member in end-to-end relationship, said clamping means being accessible through said port; and a closure member in said port closing the same.

2. A streamlined fuel tank, comprising: at least one tubular member; a first generally conical shell member having an open end disposed against and abutting one end of said tubular member and having a closed end; a second generally frusto-conical shell member having an open end disposed against and abutting the other end of said tubular member and provided with a port at its other end; first and second strut means disposed entirely within and in engagement with said first and second shell members, respectively, and adjacent the open ends thereof; screw means entirely within said tubular and shell members and extending through said tubular member and engaging said strut means and drawing said strut means toward each other so as to clamp said shell members and said tubular member in end-to-end relationship, said screw means being accessible through said port; a closure member in said port closing the same; and additional screw means extending through said closure member and engaging means within said tubular and shell members for securing said closure member in said port.

3. A fuel tank as defined in claim 1 in which said strut means engage in abutment against the inner edges of rings secured to and disposed within said shell members.

4. A fuel tank as defined in claim 1 and including sealing means interposed between each of said shell members and said tubular member and between said shell members and said closure member so as to render said fuel tank fluid tight.

5. A fuel tank as defined in claim 1 in which each of said shell members has an internal flange adjacent its open end and said tubular member has internal flanges at its opposite ends engaging said internal flanges of said shell members.

6. A fuel tank as defined in claim 1 in which each of said shell members has an internal flange adjacent its open end and said tubular member has internal flanges at its opposite ends engaging said internal flanges of said shell members, and including compressible sealing rings disposed between said interengaging flanges.

7. A fuel tank as defined in claim 1 in which each of said shell members has an internal annular flange adjacent its open end, and said tubular member has internal annular flanges at its opposite ends engaging said flanges of said shell members, one of the flanges of each interengaging pair of flanges having an annular recess therein, and a compressible sealing ring disposed in each of said recesses and compressed by the clamping of said tubular and shell members together so as to render said fuel tank fluid tight.

8. A fuel tank as defined in claim 1 in which each of said shell members has an internal annular flange adjacent its open end, and said tubular member has internal annular flanges at its opposite ends engaging said flanges of said shell members, one of the flanges of each interengaging pair of flanges having an annular recess therein, and the other of said flanges of each pair of interengaging flanges having an annular ridge received in said recess, and a compressible sealing ring disposed in each of said recesses and compressed by said ridge in response to the clamping of said tubular and shell members together so as to render said fuel tank fluid tight.

9. A fuel tank as defined in claim 1 in which each of said strut means includes a pair of crossing elements having their ends engaging rings secured to and disposed within said shell members.

10. A fuel tank, comprising: a tubular member; a first generally conical shell member having an open end disposed against and abutting one end of said tubular member; a second generally frusto-conical shell member having an open end disposed against and abutting the other end of said tubular member and provided with a port at its other end; a first strut member disposed entirely within and engaging said first shell member, said first strut member having an axial screw-threaded hole; a second strut member disposed within and engaging said second shell member and having an axial hole; a clamping spindle extending through said port and through said hole of said second strut member, said spindle having a screw-threaded end screwed into siad threaded hole of said first strut member and an intermediate peripherally grooved portion; a collar rotatable on said grooved portion of said spindle, said collar engaging against a side of said second strut member and causing said strut members to be drawn toward each other to clamp said tubular and shell members together; sealing rings compressed between the abutting ends of said tubular and shell members; and a closure member in said port closing the same.

11. A fuel tank as defined in claim 10 in which the end of said spindle opposite said threaded end is disposed within said second shell member adjacent said port and provided with wrench-engaging means by which said spindle can be rotated.

12. A fuel tank as defined in claim 10 in which the end of said spindle opposite said threaded end is disposed within said second shell member adjacent said port and provided with an axial threaded aperture, said closure member having an axial hole therein, said fuel tank also including a bolt having a head abutting the outer end of said closure member and a shank extending through said axial hole and screwed into said threaded aperture to draw said closure member firmly against the end of said second shell member.

13. A fuel tank as defined in claim 10 in which said tubular member is frusto-conical in shape so that one end thereof is of greater diameter than the other end thereof, said first shell member being of conoidal shape and joined to the end of said tubular member of gerater diameter, and said second shell member being of conoidal shape and joined to the end of said tubular member of lesser diameter, said second shell member being of greater conicity than said first shell member, said shell members and said tubular member together providing a fuel tank of streamlined contour.

14. A fuel tank, comprising: a first shell member having an open end and provided with a first cross strut means therein; a plurality of tubular members, said first shell member and said tubular members being disposed in axial alignment with their open ends in abutting relationship, the tubular member disposed most remotely from said first shell member being provided with a second cross strut means therein; a plurality of first clamping means extending longitudinally within all of said members and engaging said first and second cross strut means for retaining said first shell member and all of said tubular members in connected relationship; a second shell member having an open end engaging the end of said most remote tubular member, said second shell member having a third cross strut means therein; compressible sealing means disposed between the several abutting ends of all of said members for rendering the tank leak-proof; and a second clamping means connected between said third and said second cross strut means for retaining said second shell member in aligned abutting relation to said most remote tubular member.

15. A fuel tank, comprising: a first shell member having an open end and provided with a first cross strut means therein; a plurality of tubular members, said first shell member and said tubular members being disposed in axial alignment with their open ends in abutting relationship, the tubular member disposed most remote from said first shell member being provided with a second cross strut means therein; a plurality of first clamping means insertable through the end of said most remote tubular member and extending longitudinally within all of said members and engaging said first and second cross strut means for retaining said first shell member and all of said tubular members in connected relationship; a second shell member having an open end engaging the end of said most remote tubular member, said second shell member having a third cross strut means therein and a port in its other end; compressible sealing means disposed between the several abutting ends of all of said members for rendering the tank leak-proof; a second clamping means insertable through said port and connected between said third and said second cross strut means for retaining said second shell member in aligned abutting relation to said most remote tubular member; and a closure member insertable in said port for closing the same.

16. A fuel tank as defined in claim 15 in which said first cross strut means has a plurality of screw-threaded holes, and in which said second cross strut means has a like number of apertures aligned with said screw-threaded holes, said first clamping means including a plurality of tie-rods each having a first threaded end screwed into one of said screw-threaded holes and a second threaded end extending through one of said apertures, said first clamping means also including nuts screwed onto said second threaded ends and set up against said second cross strut means to retain said first shell member and said tubular members in connected relationship.

17. A fuel tank as defined in claim 15 in which said first shell member and said most remote tubular member have annular flanges each provided with an internal annular recess, and in which said first and second cross strut means comprise bars extending transversely of said first shell member and said most remote tubular member and having curved shoe portions engaged in said annular recesses.

18. A fuel tank as defined in claim 15 in which said first clamping means engages said first and second cross strut means at points disposed adjacent the inner surfaces of the peripheral walls of said first shell member and said most remote tubular member.

References Cited in the file of this patent

UNITED STATES PATENTS

| Number | Name | Date |
| --- | --- | --- |
| 643,787 | Brouchu | Feb. 20, 1900 |
| 783,776 | Cornell | Feb. 28, 1905 |
| 1,169,084 | Brouchu | Jan. 18, 1916 |
| 1,181,636 | Bouget | May 2, 1916 |
| 1,522,630 | Ireland | Jan. 13, 1925 |
| 1,549,153 | Scheff | Aug. 11, 1925 |
| 1,674,637 | Conway | June 26, 1928 |
| 2,375,858 | Makaroff | May 15, 1945 |
| 2,383,065 | Lehman | Aug. 21, 1945 |
| 2,383,364 | Bechman | Aug. 21, 1945 |
| 2,415,495 | Humphreys | Feb. 11, 1947 |
| 2,471,296 | Allen et al. | May 24, 1949 |

FOREIGN PATENTS

| Number | Country | Date |
| --- | --- | --- |
| 28,743 | Great Britain | of 1897 |
| 5,103 | Great Britain | of 1905 |
| 212,407 | Great Britain | Mar. 13, 1924 |
| 578,769 | Germany | June 17, 1933 |